United States Patent [19]
Fujiwara et al.

[11] Patent Number: 5,835,029
[45] Date of Patent: Nov. 10, 1998

[54] DIGITAL CONVERGENCE APPARATUS

[75] Inventors: Masanori Fujiwara, Gyoda; Tsutomu Sakamoto, Fukaya; Yoshiji Tsuzuki, Honjo; Hisayuki Mihara, Saitama-ken; Toshio Obayashi, Fukaya, all of Japan

[73] Assignee: Kabushiki Kaisha Toshiba, Kawasaki, Japan

[21] Appl. No.: 704,881

[22] Filed: Aug. 30, 1996

[30] Foreign Application Priority Data

Sep. 22, 1995 [JP] Japan .................................. 7-244916

[51] Int. Cl.⁶ .................................................. H03M 7/00
[52] U.S. Cl. .................................... 341/50; 315/368.12
[58] Field of Search ............................... 341/50, 106, 99; 315/368.12, 367

[56] References Cited

U.S. PATENT DOCUMENTS 5,194,783  3/1993  Ogino et al. .
5,272,421  12/1993  Kimura et al. ..................... 315/368.12

FOREIGN PATENT DOCUMENTS 529 570   3/1993  European Pat. Off. .
554 836   8/1993  European Pat. Off. .
595 581   5/1994  European Pat. Off. .
91/07058  5/1991  WIPO .

OTHER PUBLICATIONS

Takashi, "Full Digital Convegence System for HDTV," IEEE Transactions on Consumer Electronics 37 (1991) Aug., No. 3, NY, US, pp. 555–559.
Patent Abstracts of Japan, vol. 17, No. 601 E[1456], Nov. 4, 1993 & JP 05 183917 A (Mitsubishi), Jul. 23, 1993.
Patent Abstracts of Japan, vol. 12, No. 106 (E–596), Apr. 6, 1988 & JP 62 234488 A (NEC Home Electronics), Oct. 14, 1987.

*Primary Examiner*—Brian K. Young
*Attorney, Agent, or Firm*—Cushman Darby & Cushman Intellectual Property Group of Pillsbury Madison & Sutro LLP

[57] ABSTRACT

NTSC convergence adjusting data corresponding to a plurality of portions on a display screen is stored in a data storage section in advance. Convergence adjusting data is stored in a field memory in a NTSC scanning mode. Adjusting data transferred to the memory is supplied to a vertical interpolation circuit, and interpolation adjusting data between the adjusting points is created using the plurality of adjusting data and interpolation coefficients. Data output from the vertical interpolation circuit is A/D-converted, and supplied to a deflection coil through a low pass filter as a convergence correction signal. In a PAL scanning mode, PAL convergence adjusting data is created with use of NTSC convergence adjusting data by a control microcomputer so as to be stored in the frame memory.

30 Claims, 7 Drawing Sheets

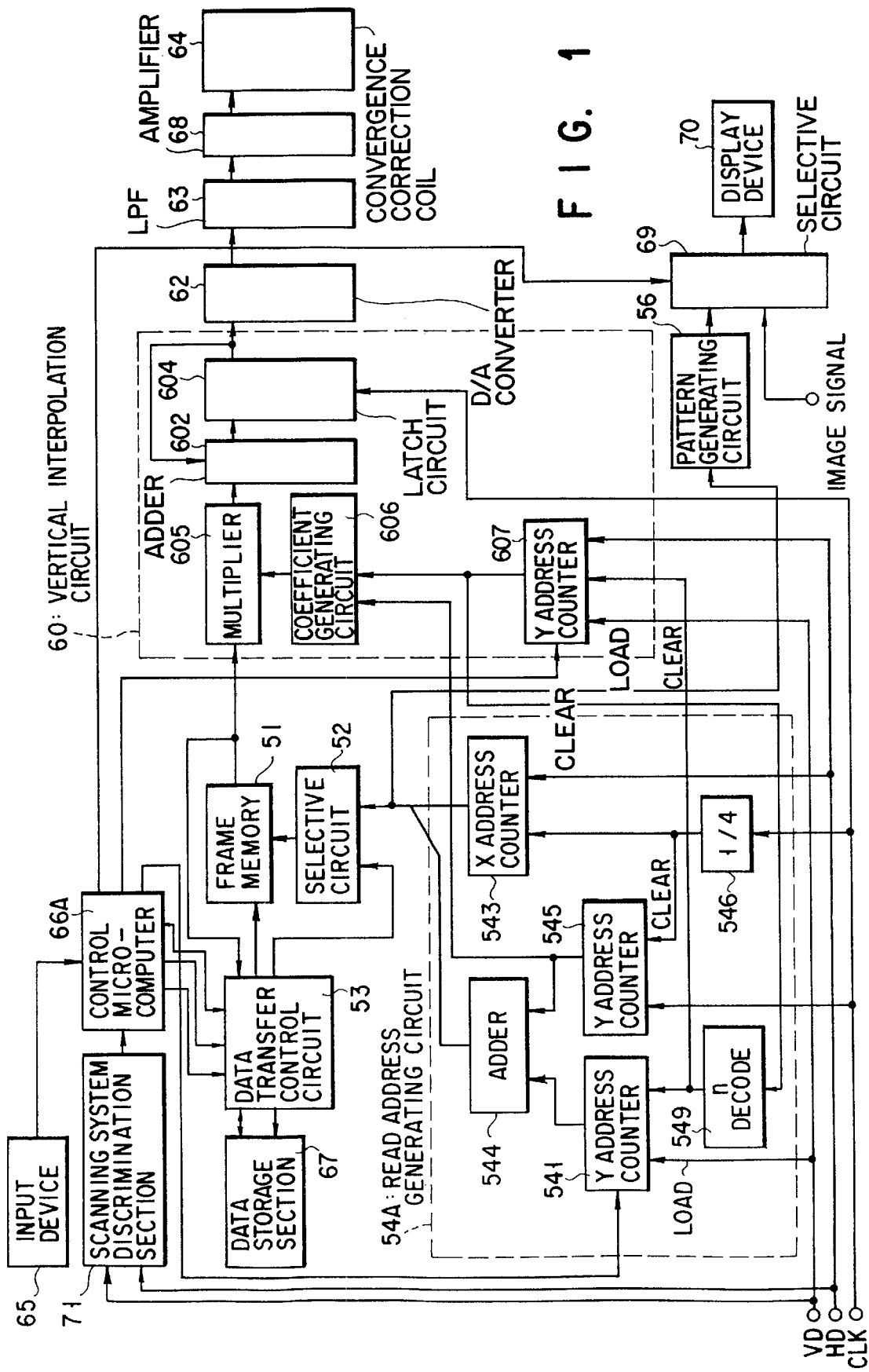
F I G. 1

F I G. 2
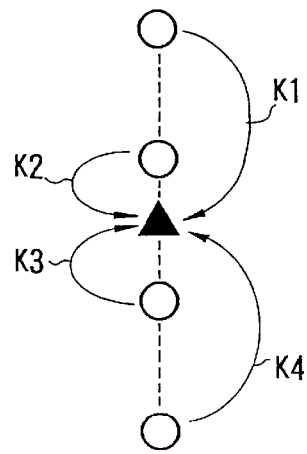
F I G. 3A
NTSC
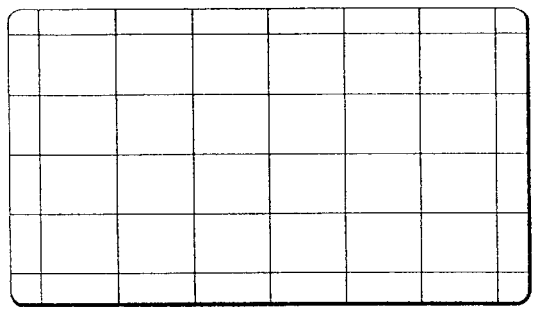
NTSC
F I G. 3B
F I G. 4A
PAL
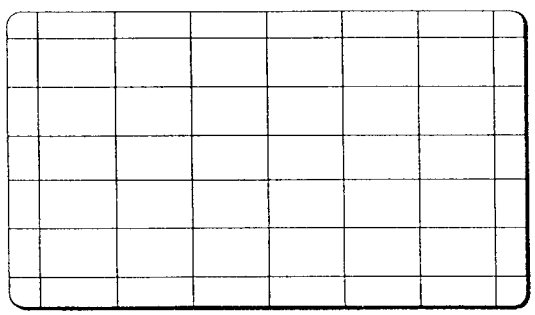
PAL
F I G. 4B

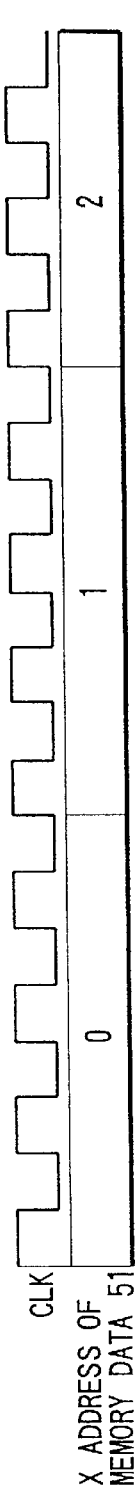
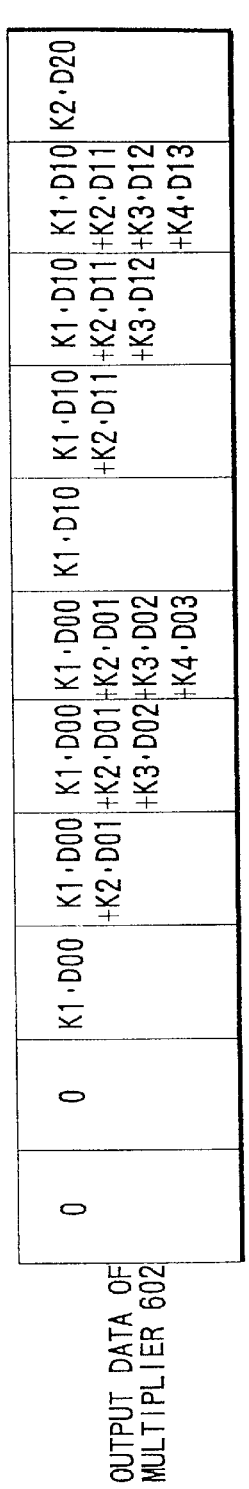
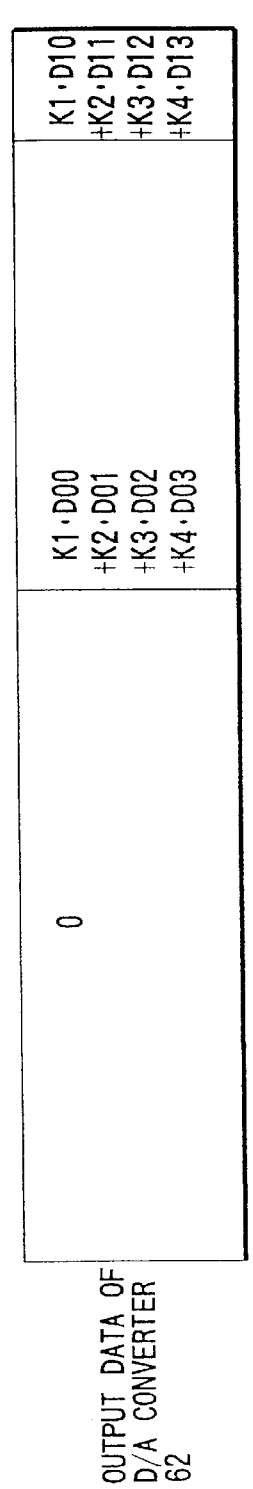
FIG. 5A CLK
FIG. 5B X ADDRESS OF MEMORY DATA 51
FIG. 5C Y ADDRESS OF MEMORY DATA 51
FIG. 5D OUTPUT DATA OF MEMORY 51
FIG. 5E OUTPUT DATA OF MULTIPLIER 605
FIG. 5F OUTPUT DATA OF MULTIPLIER 602
FIG. 5G OUTPUT DATA OF D/A CONVERTER 62

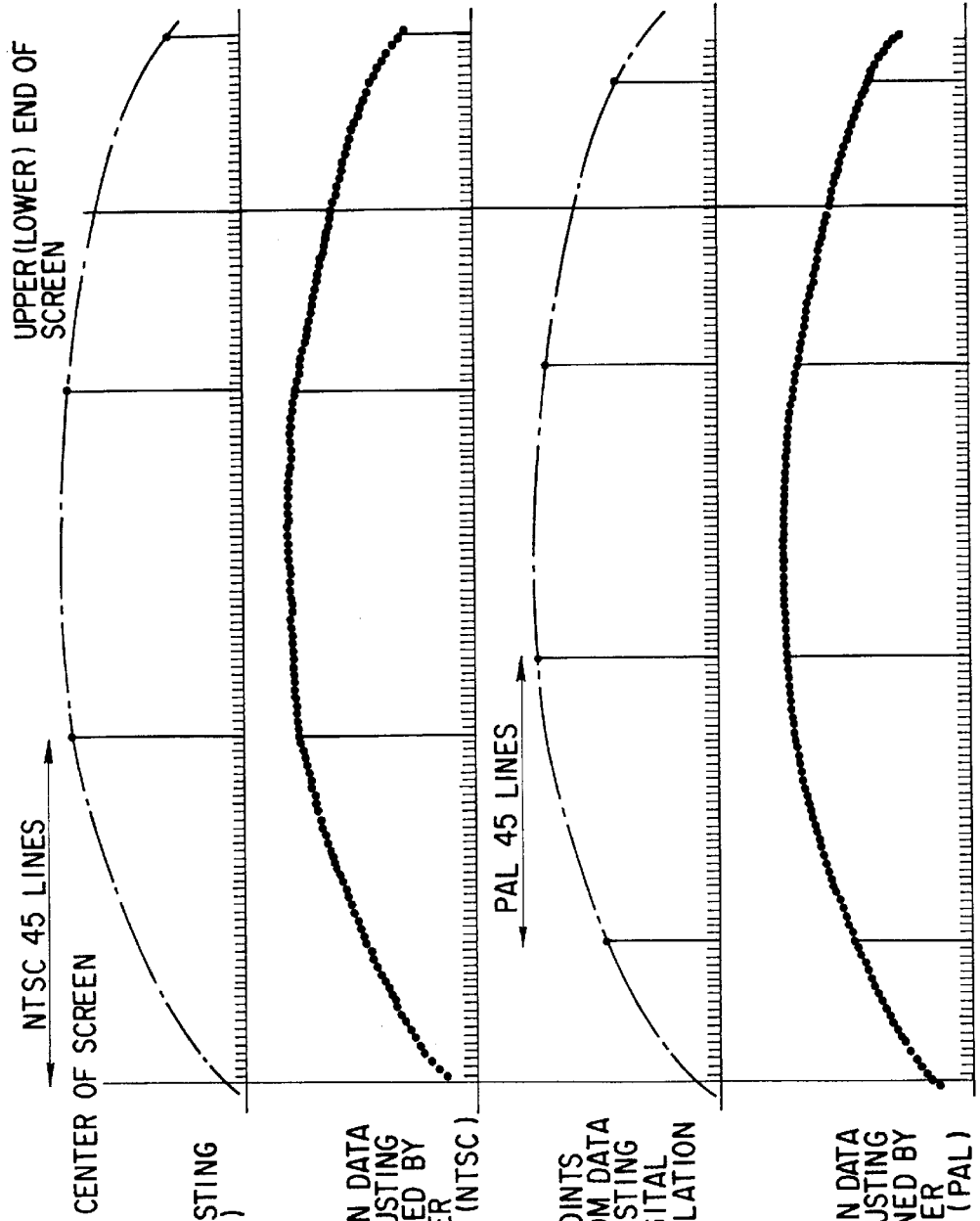

SCREEN HAVING ASPECT RATIO OF 4:3

SCREEN HAVING ASPECT RATIO OF 16:9

SCREEN HAVING ASPECT RATIO OF 16:9

SCREEN HAVING ASPECT RATIO OF 16:9

SCREEN HAVING ASPECT RATIO OF 16:9

DIGITAL CONVERGENCE APPARATUS

BACKGROUND OF THE INVENTION

1. Field of the Invention

The present invention relates to a digital convergence apparatus for use in a color television receiver, an RGB three-tube type color projector, etc., and more particularly to an apparatus of this type capable of performing convergence correction in response to various kinds of television signals.

2. Description of the Related Art

In recent years, there has been a great demand for wide screen televisions. To meet this demand, large color television receivers or projection tube type color projectors have been widely used. In the projection tube type color projectors, image signals indicative of three elementary color RGB are supplied to R-, G-, and B-projection tubes, respectively. Then, images projected from the projection tubes are superimposed on each other on a screen, thereby creating a color image. However, the projection tubes are positioned at different angles relative to the screen. Due to this, misconvergence may occur in the color image. To avoid this problem, an adjusting coil is provided for each projection tube. Then, a correction signal is supplied to the coil to generate a magnetic filed for correcting the misconvergence, thereby controlling the direction of deflection of the electron beams emitted from the tube.

A digital convergence apparatus is now used as for generating the correction signal. The digital convergence apparatus sets a plurality of adjusting points, which respectively correspond to a plurality of points on the screen. Then, the digital convergence apparatus stores convergence adjusting data, which correspond to the plurality of adjusting points, in its memory. In synchronism scanning, the convergence adjusting data is read from the memory, and converted to a convergence correction signal by digital/analog conversion. Further, an interpolation convergence adjusting data is created by interpolating convergence adjusting data corresponding to adjacent adjusting points. Then a convergence correction signal corresponding to a point on the screen interposed between the adjacent adjusting points is created by D/A converting the interpolation convergence adjusting data.

The interpolation convergence adjusting data includes data in the horizontal direction and data in the vertical direction.

In recent years, various types of image signals such as an NTSC type image signal, a PAL image signal, a computer image signal, etc. have been used. In domestic broadcasting stations, an EDTV-II image signal adapting to a wide screen TV receiver having an aspect ratio of 16:9 has also been used.

The above-mentioned image signals are different from each other with respect to their number of scanning lines. The difference means determines in a beam scanning position on the same screen, a distance between the scanning lines, and density of the scanning lines. In other words, each of these image signals has a different scanning mode where the beam scans on the screen.

A projector is now used which can project the respective images even if the plurality of image signals having a different scanning mode is supplied to the projector. In the projector of this type, a convergence apparatus is, of course, required. In such a convergence apparatus, convergence correction must be effectively performed even in a case where the images having different scanning modes are projected.

To realize the above-mentioned digital convergence apparatus, the following operations can be considered.

A plurality of adjusting points of each scanning mode is set, and convergence adjusting data of each scanning mode is stored in its memory.

However, in this case, it is necessary for a provider to create convergence adjusting data of each scanning mode to adjust the convergence of each scanning mode. Due to this, a large amount of time is required to create convergence adjusting data. Also, since more memory capacity must be needed to store the convergence adjusting data of each scanning mode, the manufacturing costs will be increased.

SUMMARY OF THE INVENTION

An object of the present invention is to provide a digital convergence apparatus wherein the number of operation steps of creating convergence adjusting data can be considerably reduced, and a memory capacity for convergence adjusting data may be small.

To attain the above object, there is provided a digital convergence apparatus comprising:

scanning mode designating means for designating a scanning mode for an image signal;

display means for displaying an image having a number of scanning lines for the designated scanning mode;

data storing means for storing first convergence adjusting data of first cross points of a cross hatch pattern when an image having a number of scanning lines for a first scanning mode is projected on the display means and the cross hatch pattern is imaginarily formed on the screen to have a predetermined distance in a horizontal direction and have a predetermined number of scanning lines with an equal distance in a vertical direction;

second convergence adjusting data creating means for creating second convergence adjusting data of second cross points of a cross hatch pattern using the first convergence adjusting data when an image having a number of scanning lines designated by a second scanning mode is projected on the display means and the cross hatch pattern is imaginarily formed on the screen to have a predetermined distance in a horizontal direction and have a predetermined number of scanning lines with an equal distance in a vertical direction;

interpolation calculation means for creating interpolation convergence adjusting data between the first cross points using the first convergence adjusting data when the first scanning mode is designated by the scanning mode designating means, and for creating interpolation convergence adjusting data between the second cross points with use of the second convergence adjusting data when the second scanning mode is designated; and supply means for converting output data of the interpolation calculation means to analog data so as to be supplied to a convergence correction coil as a convergence correction signal.

According to the above-mentioned structure, convergence adjusting data for the other modes can be obtained only by preparing convergence adjusting data for one mode. Therefore, convergence adjusting operations regarding only one mode may be performed, and the memory capacity for storing convergence adjusting data may be small.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

FIG. 1 is a view showing a first embodiment of the present invention;

FIG. 2 is a view showing an arrangement of adjusting points of the present invention;

FIG. 3A is a view showing an example of first cross hatch pattern of the present invention;

FIG. 3B is a view showing convergence adjusting data corresponding to cross points of the cross hatch pattern shown in FIG. 3A;

FIG. 4A is a view showing an example of second cross hatch pattern of the present invention;

FIG. 4B is a view showing convergence adjusting data corresponding to cross points of the cross hatch pattern shown in FIG. 4A;

FIGS. 5A to 5G are diagrammatic views showing an operation of a digital filter of the present invention;

FIGS. 6A to 6D are schematic diagrams illustrating convergence adjusting data of NTSC and PAL systems;

DETAILED DESCRIPTION OF THE PREFERRED EMBODIMENTS

Figure 7:
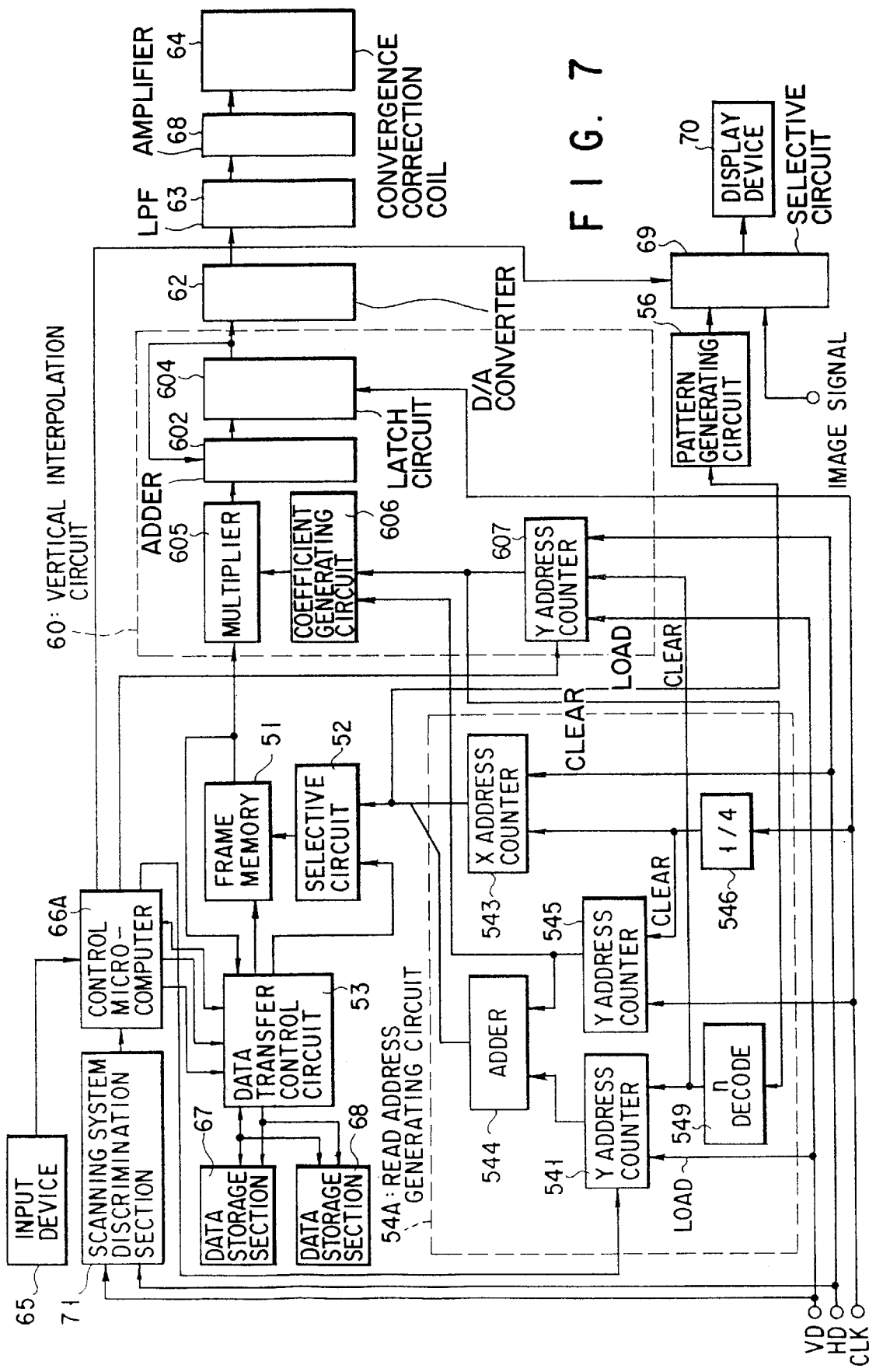
FIG. 7 is a view showing a second embodiment of the present invention.

The embodiments of the invention will be described with reference to the accompanying drawings.

First, for facilitating the understanding of the invention, it is assumed that a television receiver explained in the following embodiments can receive either an image signal of NTSC system or PAL system. Also, in a convergence apparatus explained in the following embodiments, it is assumed that interpolation for n lines between adjusting points is performed (n: 44, a distance between the adjusting points corresponds to 45 lines).

FIG. 1 is a view showing a first embodiment of the present invention.

When the power supply of a projection type projector is turned on, a control microcomputer 66A starts to operate. Image signals to be processed by the projector, i.e., a horizontal sync signal HD and a vertical sync signal VD are supplied a scanning type discrimination circuit 71. The discrimination circuit 71 detects the relationship between the horizontal sync signal HD and the vertical sync signal VD with respect to frequency so as to discriminate between the NTSC or PAL current input signal. Discrimination data is input to the microcomputer 66A. The microcomputer 66A sets a scanning mode in response to the input discrimination data.

The microcomputer 66A controls a data transfer control circuit 53. Supposing that the scanning mode is an NTSC type scanning mode, the first convergence adjusting data of a plurality of adjusting points is stored in a data storage section 67. The first convergence adjusting data of the adjusting points is transferred to a frame memory 51 by data transfer control circuit 53. At this time, a selective circuit 52 is controlled by the data transfer control circuit 53 so as to supply a write address from the control circuit 53 to the frame memory 51.

When the transfer process of the first convergence adjusting data to the frame memory 51 is finished, the control circuit 53 controls the selective circuit 52. Consequently, a read address from a read address generating circuit 54A is supplied to the frame memory 51.

The read address generating circuit 54A generates a read address synchronized with horizontal and vertical scannings using horizontal and vertical sync signals HD and VD. Consequently, the convergence adjusting data read from the frame memory 51 is synchronized with the corresponding points on the screen. The, convergence adjusting data read from the frame memory 51 is input to a vertical interpolation circuit 60.

The first convergence adjusting data of the plurality of adjusting points correspond to the dispersed points on the screen. Due to this, adjusting data (hereinafter referred to interpolation convergence adjusting data) between the adjacent adjusting points can be obtained by an interpolation process using two or four first convergence adjusting data (see FIG. 2).

The read address generating circuit 54A and the vertical interpolation circuit 60 constitute interpolation calculation means for obtaining interpolation convergence data. The vertical interpolation circuit 60 performs the interpolation process using convergence adjusting data so as to create interpolation convergence adjusting data corresponding to each scanning line in the vertical direction. The created convergence adjusting data is input to a D/A converter 62 so as to be output as an analog convergence correction signal. The analog convergence correction signal is input to a low-pass filter (LPF) 63, so that high frequency components are removed. Then, the convergence correction signal is input to an amplifier 68. The amplifier 68 amplifies the convergence correction signal so as to be supplied to a convergence correction coil 64.

In a normal image display state, the control microcomputer 66A controls a selective circuit 69 to supply the image signal to a display device 70. The convergence correction coil 64 controls the direction of deflection of electron beams, thereby contributing to projecting the image on a screen (not shown) without generating misconvergence.

The following will explain the convergence adjustment.

Supposing that the convergence adjustment is performed in the NTSC scanning mode, in the present invention, if first convergence adjusting data is created in the NTSC scanning mode, second convergence adjusting data for a PAL scanning mode can be created using first convergence adjusting data.

To perform a convergence adjustment, an input device 65 is operated so as to set an adjusting mode. The microcomputer 66A controls a selective circuit 69 to supply an adjusting pattern from a pattern generating circuit 56 to a display device 70. A read address from the read address generating circuit 54A is supplied to the pattern generating circuit 56, thereby outputting a pattern display signal for displaying an adjusting pattern such as a cross hatch pattern, etc. The adjusting pattern is displayed on a screen of the display device 70.

An adjuster operates the input device 65 by viewing the adjusting pattern on the screen to reduce the misconvergence of the plurality of adjusting points. Operation data, serving as convergence adjusting data, obtained by this adjustment is supplied to the frame memory 51 and the data storage section 67 by the control microcomputer 66A. Then, the frame memory 51 stores convergence adjusting data all of the selected adjusting points on the screen. Then, in synchronization with the scanning of the beam on the screen, convergence adjusting data is read from the frame memory 51. The read convergence adjusting data is input to the vertical interpolation circuit 60. Adjusting data corresponding to each scanning line can be obtained from the interpolation circuit 60. The obtained adjusting data is input to the D/A converter 62 so as to be output to the convergence correction coil 64 as the analog convergence correction signal. Consequently, the convergence adjustment is executed so as to reduce the misconvergence of the respective points on the screen.

The adjuster operates the input device 65 to vary convergence adjusting data of each adjusting point to reduce the misconvergence of each adjusting point, thereby realizing the convergence adjustment. By this convergence adjustment, convergence adjusting data of each of the frame memory 51 and the data storage section 67 is sequentially updated. Then, the convergence adjusting data, which is obtained when the adjustment is finished, is stored in the data storage section 67. In the image display mode, convergence adjusting data stored in the data storage section 67 is transferred to the frame memory 51 as mentioned above.

The convergence adjustment is operated based on adjusting software stored in the control microcomputer 66A. For example, if the user depresses a shift key on and on, the points to be adjusted can be moved to the corresponding adjusting points one after another. The amount of adjusting data can be increased or decreased by the depression of a (+) or (−) key in a state that the points to be adjusted are selected by the shift key. If a memory key is depressed in a state so that the misconvergence of the adjusting points is eliminated, adjusting data at this time is stored in the frame memory 51 and the data storage section 67.

The following will specifically explain the read address generating circuit 54A and the vertical interpolation circuit 60.

The read address generating circuit 54A comprises a first Y address counter 541, a second Y address counter 545, an adder 544, and an X address counter 543. An initial output value from the control microcomputer 66A is loaded onto the first Y address counter 541 when the vertical sync signal VD is supplied to a VD terminal. Then, the first Y address counter 541 counts an output of an n decoder 549. The n decoder 549 outputs a pulse when an output of a third Y address counter 607 (to be described later) reaches n. The second Y address counter 545 counts a clock pulse CLK (4×m CLKs for one horizontal scanning period). However, the second Y address counter 545 is cleared by an output of a divider 546, which divides the clock pulse CLK by four. The outputs of the first and second Y address counters 541 and 545 are added to each other by the adder 544. Then, the result of the addition is used as a Y address for the frame memory 51.

The output of the divider 546 is supplied to the X address counter 543. The X address counter 543 is cleared by the horizontal pulse HD, counts the output of the divider 546, and generates an X address. The output of the adder 544 and that of the X address counter 543 are used as an adjusting data read address to the frame memory 51.

Data output from the frame memory 51 is input to a multiplier 605. The multiplier 605 multiplies input data by a coefficient output from a coefficient generating circuit 606. An output (0 to n) from the third Y address counter 607 and an output (0 to 3) from the X address counter 543 are supplied to the coefficient generating circuit 606. A Y address of the third Y address counter 607 indicates how far exactly from the adjusting point the current scanning line is located when viewed from its specific position. The third Y address counter 607 is cleared by an output of an n decoder 549, and counts the horizontal sync signal HD. The initial output value from the control microcomputer 66A is loaded onto the third Y address counter 607 when the vertical sync signal VD is supplied to the VD terminal. Also, the output of the third Y address counter 607 is supplied to the n decoder 549.

As mentioned above, the initial output value from the control microcomputer 66A is loaded onto each of the first and third Y address counters 541 and 607 when the vertical sync signal VD is supplied to the VD terminal. This is because the initial output value from the microcomputer 66A is changed such that a phase of the convergence correction signal is varied by a scanning line in accordance with the scanning mode.

An output of the multiplier 605 is input to an adder 602. An output of the adder 602 is supplied to a latch circuit 604. An output of the latch circuit 604 is supplied to the D/A converter 62, and input to the adder 602. Consequently, the cumulative addition result of the output of the multiplier 605 can be obtained from the latch circuit 604.

The vertical interpolation circuit 60 comprises a digital filter, which creates interpolation convergence adjusting data using at least four adjusting data paints existing in the vertical direction. Also, the digital filter has an FIR type low-pass characteristic.

FIG. 2 shows an example of interpolation convergence adjusting data and coefficients K1 to K4. In this figure, a black triangle mark 94 is interpolation data, which is a position of a scanning line to be obtained. White circle marks 90, 91, 92, and 93 are positions of convergence adjusting data input in advance. The coefficients K1 to K4 are obtained using the of interpolation data and four adjusting data. In other words, the coefficients K1 to K4 are calculated in advance in accordance with the position of interpolation data, and the calculation result is stored in the coefficient generating circuit 606. The distance between each of the white circle marks and the black triangle mark can be calculated based on the outputs (0 to 3) from the second Y address counter 545 and the outputs (0 to n) from the third Y address counter 607. The output from the third Y address counter 607 shows the distance between the white circle 91 and the black triangle 94. Supposing that the output from the third Y address counter 607 is $\alpha$, the distance between each of the white circles 90, 91, 92, 93 and the black triangle 94 can be expressed as follows $(n+1)+\alpha, \alpha, (n+1)-\alpha, 2\times(n+1)-\alpha$ In the coefficient generating circuit 606, the distance between the line to be interpolated and each of the upper and lower adjusting points is obtained based on the outputs (0 to 3) of the counter 545 and the output $\alpha$ of the counter 607. Then, the coefficient generating circuit 606 outputs the coefficient of the FIR type filter in accordance with the obtained distance. The coefficient of the FIR type filter is calculated in advance based on the theory of the FIR type filter, and the calculated coefficient may be written onto a memory element such a ROM table, etc. When the coefficient is read, the address from the second Y address counter 545 and the address from the third Y address counter 607 are combined with each other so as to be used as the read address.

FIG. 3A shows a state that the adjusting points for NTSC on the screen, i.e., a cross hatch pattern from the pattern generating circuit 56 is displayed on the display device 70. A cross point between horizontal and vertical lines is defined as an adjusting point. FIG. 3B shows convergence adjusting data, which correspond to the respective adjusting points, stored in the data storage section 67. In this figure, the number of the adjusting points for NTSC is seven points in the horizontal direction and five points in the vertical direction. The convergence adjusting data corresponding to these adjusting points is set to reduce misconvergence on the screen in the above-mentioned adjusting mode.

FIG. 4A shows a state that the adjusting points for PAL on the screen, i.e., a cross hatch pattern from the pattern generating circuit 56 is displayed on the display device 70. A cross point between horizontal and vertical lines is defined as an adjusting point. FIG. 4B shows convergence adjusting data, which correspond to the respective adjusting points, stored in the data storage section 67. In this figure, the number of the adjusting points for PAL is seven points in the horizontal direction and six points in the vertical direction. The convergence adjusting data corresponding to these adjusting points is set to reduce misconvergence on the screen in the above-mentioned adjusting mode.

In this embodiment, the number of scanning lines between the adjusting points is 44 in the vertical direction. In the this embodiment, the number of the scanning liens is fixed in either scanning mode.

Generally, the smaller the number of the adjusting points is, the more adjusting time is reduced. However, if the number of the adjusting points is too small, it is impossible to obtain a desirable waveform of the convergence correction signal. Particularly, the arrangement of the adjusting points in the vertical direction must be considered. Actually, it is required that the total number of the adjusting points in the vertical direction be five or more on the effective screen. If the total number is below five, a favorable RGB convergence cannot be obtained over the entire effective screen. On the other hand, it seems that a better convergence correction signal may be obtained as the number of the adjusting point increases more. However, even if eight or more adjusting points are arranged on the effective screen, the signal waveform of the convergence correction signal does not change. However, the following problems will be generated.

Specifically, the total amount of time for the completion of the adjustment is increased. Also, the capacity of the data storage section 67 and that of the frame memory 51 are increased.

Therefore, it is preferable that the total number of the adjusting points in the vertical direction be set five or more and eight or less in view of cost/performance. In other words, each distance between the adjusting points is preferably set to correspond to ¼ or less and ⅐ or more of the total number of interlaced lines on the effective screen. By utilizing the interpolation process in the vertical direction using the above-explained FIR digital filter, a favorable interpolation process, which satisfies the above-mentioned condition, can be performed.

The above method of determining the number of adjusting points can be applied to the image signals of the various systems. In other words, the number of adjusting points in the vertical direction can be set to correspond to ¼ to ⅐ of the number of scanning lines of the images projected on the screen.

FIGS. 5A to 5G are views showing an operation of the digital filter provided in the interpolation circuit 60.

FIG. 5A shows a clock pulse CLK (4×m CLKs for one horizontal scanning period, m=an integer). FIG. 5B is an X address for the memory 51. The X address advances by one per four basic clock pulse CLKs. FIG. 5C is a Y address for the frame memory 51. The Y address is increased one by one per basic clock pulse CLK. In this figure, count values 0, 1, 2, 3, 0, 1, 2, 3, 0, 1, . . . are output. However, if the first Y address counter 541 is counted up after n horizontal scanning, count values 1, 2, 3, 4, 1, 2, 3, 4, . . . are output, and the following count values are changed in the same manner. FIG. 5D shows adjusting data corresponding to each of the adjusting points. FIG. 5E shows an output result of the multiplier 605. The coefficients K1, K2, K3, K4 are obtained from the coefficient generating circuit 606. Each of the obtained coefficients K1, K2, K3, K4 is multiplied by correction data output from the frame memory 51 so as to obtain K1×D00, K2×D01, K3×D02 and K4×D03. FIG. 5F shows output data from the adder 602, i.e., the result obtained by adding data from the multiplier 605 to data from the latch circuit 604. Since "0" is first stored in the latch circuit 604, only K1×D00 is output from the multiplier 607 so as to be stored in the latch circuit 604. At the next cycle, K2×D00 is output from the multiplier 605 to be added to K1×D00 stored in the latch circuit 604, so that the result of the addition is again stored in the latch circuit 604 again. Next, K3×D02 is added to data stored in the latch circuit 604, and K4×D03 is finally added thereto so as to be stored in the latch circuit 604. FIG. 5G is output data from the D/A converter 62. After four additions using the adder 602, data K1×D00+K2×D01+K3×D02+ and K4×D03 is output from the latch circuit 604 so as to be converted to an analog value. Such an operation is repeated, and after four clocks, data K1×D10+K2×D11+K3×D12+K4×D13, which correspond to the right next side on the screen, are output to the D/A converter 62. After n scanning line processes, adjusting data for a next row is output from the frame memory 51. At this time, data K1×D01+K2×D02+K3×D03+K4×D04 is output from the latch circuit 604.

As mentioned above, the interpolation calculation using convergence adjusting data at four upper and lower adjusting points is repeated so as to create interpolation convergence adjusting data between the adjusting points. In this case, data smoothness, continuity, and curve lines are determined by a frequency characteristic of LPF, which is decided by a tap coefficient of the digital filter. If a suitable frequency characteristic is selected, interpolation can be smoothly performed. Generally, the convergence correction signal does not include smooth high frequency components. Due to this, if the tap coefficient is appropriately selected, an ideal interpolation calculation can be performed. In the actual operation, interpolation data between D00 and D01, and data, which is positioned at an upper side than D00 (outside of the effective screen) in its vertical direction, must be obtained.

In this case, interpolation convergence adjusting data may be obtained on the following assumption.

Specifically, it is assumed that convergence adjusting data having the same value as D00 exist at two points, which are positioned at the upper side of D00 (outside of the effective screen), to have an equal distance.

In this case, in obtaining interpolation convergence adjusting data, which exist at the upper side of D00 (outside of the effective screen), the count-up operation of the counter 545 may be improved such that the count values are set to 0, 0, 0, 1, . . . In obtaining interpolation convergence adjusting data between D00 and D01, the count-up operation of the counter 545 may be improved such that the count values are set to 0, 0, 1, 2, . . .

At this time, interpolation calculation means, which comprises the read address generating circuit 54 and the vertical interpolation circuit 60, performs an interpolation calculation process based on the following assumption.

Specifically, in obtaining interpolation convergence adjusting data, which are positioned at the upper side of D00 (outside of the effective screen), a plurality of adjusting data continuously exist at the upper side. In obtaining interpolation convergence adjusting data, which exist at the lower side than D04 (outside of the effective screen), a plurality of adjusting data also continuously exist at the lower side.

As the other method, interpolation convergence adjusting data, which is positioned at the upper side of D00, may be obtained on the following assumption.

Specifically, the adjusting data exist at the upper side than D00 (outside of the effective screen) to have the same difference as the difference between data D00 and D01, which do exist on the effective screen.

At this time, interpolation calculation means performs an interpolation calculation process based on the following assumption.

More specifically, in obtaining interpolation convergence adjusting data, which exist at the upper side of D00 (outside of the effective screen), a plurality of adjusting data must continuously exist at the upper side. In this case, the plurality of adjusting data has the same difference as the difference between data D00 and D01 existing on the effective screen. To obtain interpolation convergence adjusting data, which exist at the lower side than D04 (outside of the effective screen), a plurality of adjusting data continuously exist at the lower side. In this case, the plurality of adjusting data has the same difference as the difference between data D04 and D03 existing on the effective screen.

The following will explain an operation to process the PAL image signal.

According to the present invention, in the scanning mode when the PAL image signal is processed, the same convergence adjusting data that was utilized in processing the NTSC image signal is used. Thus the calculating of PAL convergence adjusting data corresponding to the plurality of adjusting points is stored in the frame memory 51.

FIG. 6A shows convergence adjusting data corresponding to the plurality of adjusting points in the NTSC scanning mode. In this figure, a horizontal line shows a vertical line of the screen, and convergence adjusting data (black point) exists every 45 lines. In the NTSC system, vertical interpolation is performed by the vertical interpolation circuit 60. Consequently, create interpolation convergence adjusting data is created, and a good convergence correction signal can be obtained as shown in FIG. 6B.

FIG. 6C shows convergence adjusting data corresponding to the plurality of adjusting points in the PAL scanning mode. In this figure, a horizontal line shows a vertical line of the screen, and convergence adjusting data (black point) exists every 45 lines. It can be seen that the above convergence adjusting data, which is placed at the same position as adjusting data of FIG. 6B, is extracted from the large amount of adjusting data of FIG. 6B. FIG. 6D shows interpolation convergence adjusting data, which is obtained by interpolating interpolation convergence adjusting data for 44 lines between adjusting data of FIG. 6C.

The following will explain an operation of a digital convergence correction when the PAL image signal is received. A scanning system discrimination circuit 71 detects a PAL system based on the horizontal synch signal HD and the vertical synch signal VD. The microcomputer 66A starts an operation in accordance with the PAL system based on the discrimination data from the discrimination circuit 71. In this case, a user may set discrimination data through the input device 65.

The microcomputer 66A obtains access to the data transfer control circuit 53 so as to fetch correction data for NTSC stored in the data storage section 67. The microcomputer 66A comprises the same process algorithm as the digital filter used in the vertical interpolation circuit 60 to create convergence adjusting data for PAL as shown in FIG. 6C. Convergence adjusting data for PAL is transferred to the frame memory 51 through the data transfer control circuit 53.

The microcomputer 66A provides an initial value to each of the first Y address counter 541 and the third Y address counter 607. The initial value is used to set a positional phase for a scanning line on the screen corresponding to the number of PAL scanning lines.

The NTSC system and PAL system differ from each other in the phase of the convergence correction signal in the vertical synch signal VD. Due to this, the initial value of the address counter is changed, thereby adjusting the output phase of the convergence correction signal to each system. After convergence adjusting data for PAL is created, interpolation convergence adjusting data is created similar to the case of the NTSC system.

According to the present invention, if convergence adjusting data is created in the NTSC scanning mode, created adjusting data can be effectively used in the PAL scanning mode. Due to this, the memory capacity for convergence adjusting data may be small. Moreover, the present invention can be applied to the other scanning modes such as a computer graphic image, etc. In this case, the microcomputer 66A provides an initial value to the Y address counter to adjust the positional phase for a convergence correction signal.

FIG. 7 shows the other embodiment of the present invention

The part, which is different from the first embodiment of FIG. 1, is that a second data storage 68 is provided to be connected to the data transfer control circuit 53. In the first data storage section 67, NTSC convergence adjusting data is stored.

At a PAL convergence adjusting time, NTSC convergence data stored in the data storage section 67 is temporarily fetched to the microcomputer 66A so at to create PAL convergence adjusting data. Then, PAL convergence adjusting data is stored in the second data storage section 68. Thereafter, convergence adjusting data is stored in the frame memory 51 through the data transfer control circuit 53 to be used as convergence data in the PAL convergence adjusting mode. In this case, PAL convergence adjusting data is created using data where NTSC convergence adjustment is finished. Due to this, the adjusting operation can be easily finished without performing a complicated adjustment.

Data stored in the data storage section 68 is used when a PAL image signal is received the next time.

In the above explanation, the digital filter algorithm was provided to the microcomputer 66A, thereby creating PAL convergence adjusting data. However, PAL convergence adjusting data can be realized by other digital signal processors.

Figure 8:
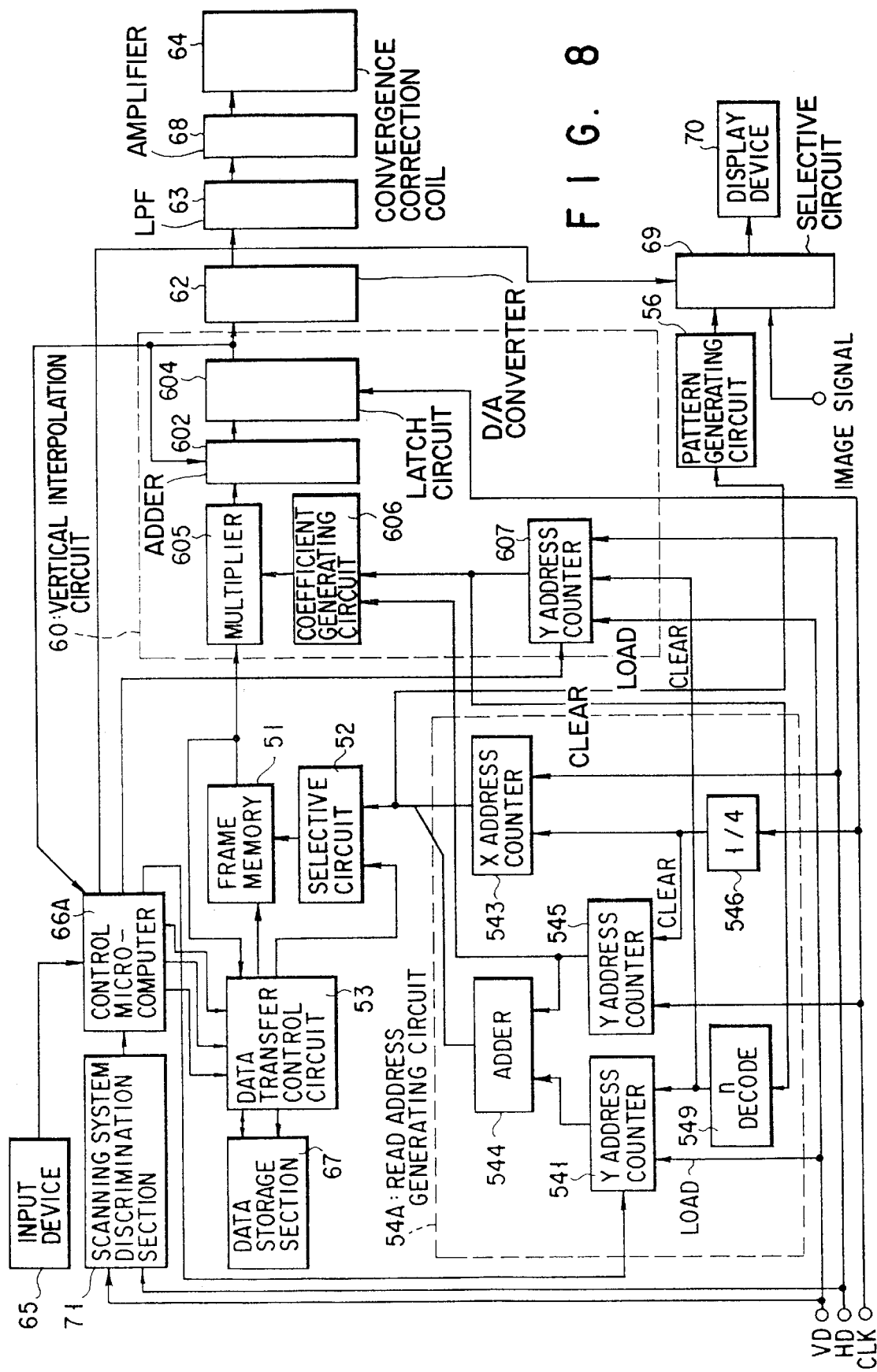
FIG. 8 is a view showing a third embodiment of the present invention.

FIG. 8 shows another the other embodiment of the present invention.

In the aforementioned embodiments, in the microcomputer 66A, software was provided for creating PAL second convergence adjusting data using NTSC first convergence adjusting data. However, PAL second convergence adjusting data can be created by the digital filter comprising the read address generating circuit 54A and the vertical interpolation circuit 60. In this case, as shown in FIG. 8, output data from the vertical interpolation circuit 60 is fed back to the microcomputer 66A. The microcomputer 66A controls data of the adjusting points shown in FIG. 6C to be stored in the frame memory 51.

According to the above-mentioned invention, in an apparatus for projecting an image whose number of scanning lines displayed on the screen is different in accordance with the mode, adjusting data can be created as follows.

Specifically, the number of interpolation scanning lines between the adjusting points in the vertical direction is fixed. Then, convergence adjusting data for use in the second scanning mode is created using convergence adjusting data for use in the first scanning mode. In this case, position data of the respective adjusting points can be detected from a distance ratio between the scanning lines of the first mode and those of the second mode. Then, a coefficient for obtaining adjusting data can be determined based on the position data of the adjusting points.

As mentioned above, first convergence adjusting data is created, and second convergence adjusting data can be automatically created using first convergence adjusting data. The number of interpolation scanning lines between the adjusting points in the vertical direction is fixed. Then, convergence adjusting data used in the second scanning mode is created using convergence adjusting data used in the first scanning mode. As a result, convergence adjustment is performed using first convergence adjusting data in the first scanning mode, thereby obtaining a good convergence correction signal even in the second scanning mode.

In recent years, wide screen television receivers have largely in demand.

The wide screen television receivers are characterized in that the aspect ratio of the screen size is 16:9 (horizontal: vertical) as compared with 4:3 of the screen size conventionally used. In the case of 16:9 of the screen size, a wide screen image can be projected on a full of the screen.

Figure 9A:
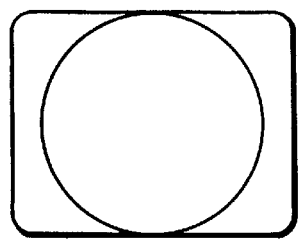
FIG. 9A is a view showing a display state of a normal television receiver.
Figure 9B:
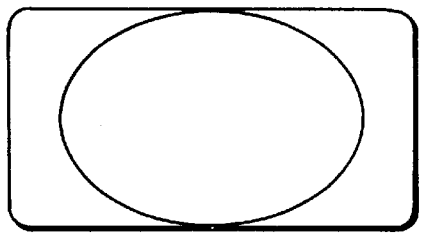
FIGS. 9B to 9E are views each showing a display mode of a wide screen television receiver.

If an image for a 4:3 aspect ratio of the screen size (FIG. 9A) is projected on the screen 16:9 of the aspect ratio, a horizontally distorted image is formed. (FIG. 9B). To reduce such image distortion, the following three display methods as shown in FIGS. 9C, 9D, and 9E can be utilized.

Figure 9C:
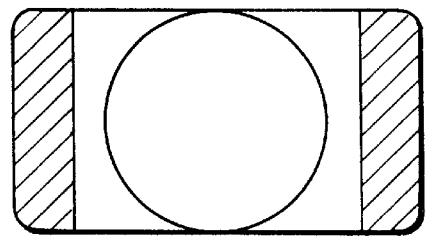

In the display method of FIG. 9C, the image for a 4:3 aspect ratio is compressed in a horizontal direction. Then, the so-called side panels, which are black or gray non-image areas, are added to right and left sides of the image to project the image. In other words, the image is compressed in the horizontal direction from the state of FIG. 9B.

Figure 9D:
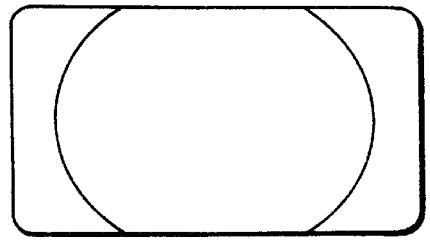

In the display method of FIG. 9D, the image for a 4:3 aspect ratio is expanded in a vertical direction to be horizontally projected on the full of the screen. In this case, the beam distance in the vertical direction is enlarged. The upper and lower portions of the image are partially cut. In other words, the image is expanded in the vertical direction from the state of FIG. 9B.

Figure 9E:
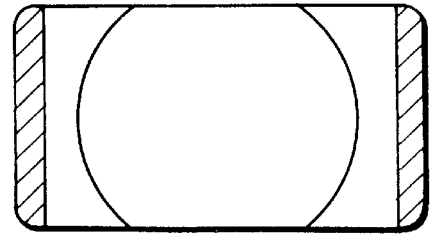

The display method of FIG. 9E is an intermediate method between the methods of FIGS. 9C and 9D.

Most of the wide screen television receivers, which are now coming on the market, comprise the above-mentioned three display methods of FIG. 9C to 9E.

Even in the program tube type projector, wide screens have been in demand. Similar to the television receiver, the above-mentioned three methods of displaying the image for a 4:3 aspect ratio have been desired. Since these methods are different from each other in the beam distance in the vertical direction, the value of convergence adjusting data of the respective methods differs. Due to this, if convergence adjusting data of the respective methods is prepared, more memory capacity must be needed to store convergence adjusting data, and a large amount of time is required to create convergence adjusting data.

In the present invention, for example, convergence adjustment of the display of FIG. 9B is performed so as to create convergence adjusting data. Thereby, convergence adjusting data stored in the data storage section 67 can be effectively used even in each of the cases of the display shown in FIGS. 9C, 9D, and 9E. As a result, convergence adjustment of each method is not needed, and the memory capacity can be reduced.

The embodiment explained the case in which the scanning length of each beam on the screen in the horizontal direction is fixed and the number of the lines and the scanning length in the vertical direction are different from each other. However, the present invention can be applied to the case in which the scanning length of each beam in the horizontal direction differs. More specifically, a digital filter which can interpolate about 35 to 40 lines in the vertical direction is used. Even if the scanning length in the horizontal direction is changed and the position of the adjusting point is slightly moved, adjusting data of the slightly moved point can be calculated if the relationship between the slightly moved point and the original adjusting point is detected in advance.

The above embodiment explained the case using the NTSC system (number of scanning lines 525/2 per one field) and the PAL system (number of scanning lines 625/2 per one field). However, since an SECAN system has the number of scanning lines 625/2 per one field, the present invention can be applied to a display device using the NTSC system and SECAM system.

Also, the present invention can be applied to a display device, which can project the NTSC image whose number of scanning lines per one filed is different and an image of a high definition television (HDTV), which is used processes in such as a Hi-Vision broadcasting. Moreover, the present invention can be applied to a display device which can project the NTSC image and a computer output image.

As mentioned above, according to the present invention, convergence adjustment is performed in a specific scanning mode to obtain convergence adjusting data. Then, obtained adjusting data is stored in the memory. Thereafter, the interpolation calculation using obtained convergence adjusting data is performed by the digital filter so as to obtain convergence adjusting data for the other scanning mode. Therefore, in the convergence adjusting process at the time of manufacturing, a convergence adjustment for a specific scanning mode may be performed, so that the number of adjusting steps is small. Thus, many advantages can be obtained such as improvement of conductivity, a reduction in the memory capacity, etc.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital convergence apparatus comprising:
   scanning mode designating means for designating a scanning mode for an image signal;
   display means for displaying an image having a number of scanning lines for said designated scanning mode;
   data storing means for storing first convergence adjusting data of first cross points of a first cross hatch pattern when an image having a number of scanning lines for a first scanning mode is projected on said display means and said first cross hatch pattern is imaginarily formed on said screen to have a predetermined distance in a horizontal direction and have a predetermined number of scanning lines with an equal distance in a vertical direction;

second convergence adjusting data creating means for creating second convergence adjusting data of second cross points of a second cross hatch pattern based only on said first convergence adjusting data when an image having a number of scanning lines designated by a second scanning mode is projected on said display means and said second cross hatch pattern is imaginarily formed on said screen to have a predetermined distance in the horizontal direction and have a predetermined number of scanning lines with an equal distance in the vertical direction;

interpolation calculation means for creating first interpolation convergence adjusting data between said first cross points using said first convergence adjusting data when said first scanning mode is designated by said scanning mode designating means, and for creating second interpolation convergence adjusting data between said second cross points using said second convergence adjusting data when said second scanning mode is designated; and supply means for converting output data of said interpolation calculation means to analog data so as to be supplied to a convergence correction coil as a convergence correction signal.

2. A digital convergence apparatus comprising:

scanning mode designating means for designating a scanning mode for an image signal;

display means for displaying an image having a number of scanning lines for said designated scanning mode;

a plurality of data storing means for storing convergence adjusting data of cross points of a cross hatch pattern for each mode when an image having a number of scanning lines for each of a plurality of scanning modes is projected on said display means and said cross hatch pattern is imaginarily formed on said screen to have a predetermined distance in a horizontal direction and have a predetermined number of scanning lines with an equal distance in a vertical direction;

convergence adjusting data creating means for creating each convergence adjusting data for at least one of the other scanning modes based only on calculations of convergence adjusting data of cross points of a cross hatch pattern for a specific scanning mode among said plurality of said scanning modes so as to be stored in said corresponding storing means;

interpolation calculation means for creating interpolation convergence adjusting data between said cross points for the designated scanning mode using convergence adjusting data corresponding to the scanning mode designated by said scanning mode designating means, said converge adjusting data output from said data storing means; and supply means for converting output data of said interpolation calculation means to analog data so as to be supplied to a convergence correction coil as a convergence correction signal.

3. The apparatus according to claim 1 or 2, wherein said scanning mode designating means receives a discrimination signal output from an automatic discrimination section for discriminating the scanning mode using a synch signal of said image signal.

4. The apparatus according to claim 1 or 2, wherein said scanning mode designating means receives a scanning mode discrimination signal output from a scanning device operated by a user.

5. The apparatus according to claim 2, wherein two of said plurality of said scanning modes are different from each other in regards to the number of scanning lines.

6. The apparatus according to claim 2, wherein two of said plurality of said scanning modes are different from each other in regards to the distance between scanning lines.

7. The apparatus according to claim 2, wherein each of two of said plurality of said scanning modes processes an image signal having a different broadcasting system.

8. The apparatus according to claim 2, wherein each of two of said plurality of said scanning modes processes an image signal having a different scanning length in a horizontal direction.

9. The apparatus according to claim 2, wherein said predetermined number of scanning lines of said specific scanning mode among said plurality of said scanning modes is ¼ to ⅐ of a total number of lines of the image projected on the screen in the specific scanning mode.

10. The apparatus according to claim 2, wherein said interpolation calculation means is a digital filter having a low pass characteristic of FIR type to create the interpolation convergence adjusting data using the convergence adjusting data corresponding to at least four adjusting points in the vertical direction.

11. The apparatus according to claim 1 or 2, wherein said convergence adjusting data creating means is a microcomputer having a low pass digital filter algorithm.

12. The apparatus according to claim 1, wherein said second convergence adjusting data creating means uses an output from said interpolation calculation means.

13. The apparatus according to claim 1, wherein said first and second scanning modes are different from each other in regards to the number of scanning lines.

14. The apparatus according to claim 1, wherein said first and second scanning modes are different from each other in regards to the distance between scanning lines.

15. The apparatus according to claim 1, wherein each of said first and second scanning modes processes an image signal having a different broadcasting system.

16. The apparatus according to claim 1, wherein each of said first and second scanning modes processes an image signal having a different scanning length in the horizontal direction.

17. The apparatus according to claim 1, wherein said predetermined number of scanning lines of said first scanning mode is ¼ to ⅐ of a total number of lines of the image projected on the screen in said first scanning mode.

18. The apparatus according to claim 1, wherein said interpolation calculation means is a digital filter having a low pass characteristic of FIR type to create the first and second interpolation convergence adjusting data respectively using the first and second convergence adjusting data corresponding to at least four adjusting points in the vertical direction.

19. A digital convergence apparatus comprising:

scanning mode designating means for designating a scanning mode for an image signal;

display means for displaying an image having a number of scanning lines for said designated scanning mode;

data storing means for storing first convergence adjusting data of first cross points of a first cross hatch pattern when an image having a number of scanning lines for a first scanning mode is projected on said display means and said first cross hatch pattern is imaginarily formed on said screen to have a predetermined distance in a horizontal direction and have a predetermined number of scanning lines with an equal distance in a vertical direction;

second convergence adjusting data creating means for creating second convergence adjusting data of second cross points of a second cross hatch pattern using said first convergence adjusting data without any additional measurement when an image having a number of scanning lines designated by a second scanning mode is projected on said display means and said second cross hatch pattern is imaginarily formed on said screen to have a predetermined distance in the horizontal direction and have a predetermined number of scanning lines with an equal distance in the vertical direction;

interpolation calculation means for creating first interpolation convergence adjusting data between said first cross points using said first convergence adjusting data when said first scanning mode is designated by said scanning mode designating means, and for creating second interpolation convergence adjusting data between said second cross points using said second convergence adjusting data when said second scanning mode is designated; and supply means for converting output data of said interpolation calculation means to analog data so as to be supplied to a convergence correction coil as a convergence correction signal.

20. A digital convergence apparatus comprising:

scanning mode designating means for designating a scanning mode for an image signal;

display means for displaying an image having a number of scanning lines for said designated scanning mode;

data storing means for storing first convergence adjusting data of first cross points of a first cross hatch pattern when an image having a number of scanning lines for a first scanning mode is projected on said display means and said first cross hatch pattern is imaginarily formed on said screen to have a predetermined distance in a horizontal direction and have a predetermined number of scanning lines with an equal distance in a vertical direction;

second convergence adjusting data creating means for creating second convergence adjusting data of second cross points of a second cross hatch pattern using said first convergence adjusting data without measuring a deflection current when an image having a number of scanning lines designated by a second scanning mode is projected on said display means and said second cross hatch pattern is imaginarily formed on said screen to have a predetermined distance in the horizontal direction and have a predetermined number of scanning lines with an equal distance in the vertical direction;

interpolation calculation means for creating first interpolation convergence adjusting data between said first cross points using said first convergence adjusting data when said first scanning mode is designated by said scanning mode designating means, and for creating second interpolation convergence adjusting data between said second cross points using said second convergence adjusting data when said second scanning mode is designated; and supply means for converting output data of said interpolation calculation means to analog data so as to be supplied to a convergence correction coil as a convergence correction signal.

21. The apparatus according to claim 19 or 20, wherein said scanning mode designating means receives a discrimination signal output from an automatic discrimination section for discriminating the scanning mode using a synch signal of said image signal.

22. The apparatus according to claim 19 or 20, wherein said scanning mode designating means receives a scanning mode discrimination signal output from a scanning device operated by a user.

23. The apparatus according to claim 19 or 20, wherein said first and second scanning modes are different from each other in regards to the number of scanning lines.

24. The apparatus according to claim 19 or 20, wherein said first and second scanning modes are different from each other in regards to the distance between scanning lines.

25. The apparatus according to claim 19 or 20, wherein each of said first and second scanning modes processes an image signal having a different broadcasting system.

26. The apparatus according to claim 19 or 20, wherein each of said first and second scanning modes processes an image signal having a different scanning length in the horizontal direction.

27. The apparatus according to claim 19 or 20, wherein said predetermined number of scanning lines of said first scanning mode is ¼ to ⅐ of a total number of lines of the image projected on the screen in said first scanning mode.

28. The apparatus according to claim 19 or 20, wherein said interpolation calculation means is a digital filter having a low pass characteristic of FIR type to create the first and second interpolation convergence adjusting data respectively using the first and second convergence adjusting data corresponding to at least four adjusting points in the vertical direction.

29. The apparatus according to claim 19 or 20, wherein said second convergence adjusting data creating means is a microcomputer having a low pass digital filter algorithm.

30. The apparatus according to claim 19 or 20, wherein said second convergence adjusting data creating means uses an output from said interpolation calculation means.

* * * * *